United States Patent [19]
Reinhard et al.

[11] Patent Number: 5,884,973
[45] Date of Patent: Mar. 23, 1999

[54] ACTUATING MECHANISM FOR UNLOCKING THE SAFETY-CATCH OF A FOLDABLE BACK OF A CAR SEAT

[75] Inventors: Wilhelm Reinhard, Rodenberg; Norbert Besselmann, Stadthagen, both of Germany

[73] Assignee: Bertrand Faure Sitztechnik GmbH & Co. KG, Stadthagen, Germany

[21] Appl. No.: 875,282

[22] PCT Filed: Oct. 11, 1996

[86] PCT No.: PCT/EP96/04419

§ 371 Date: Jul. 23, 1997

§ 102(e) Date: Jul. 23, 1997

[87] PCT Pub. No.: WO97/27074

PCT Pub. Date: Jul. 31, 1997

[30] Foreign Application Priority Data

Jan. 23, 1995 [DE] Germany ............... 196 02 211.8

[51] Int. Cl.[6] ............................................. B60N 2/20
[52] U.S. Cl. ............................. 297/378.12; 296/65.17
[58] Field of Search .................... 297/378.12, 378.1, 297/378.13, 336; 296/65.16, 65.17, 65.18

[56] References Cited

U.S. PATENT DOCUMENTS

| 5,240,309 | 8/1993 | Kojer ........................... 296/65.17 X |
| 5,527,087 | 6/1996 | Takeda et al. ...................... 297/15 |
| 5,662,368 | 9/1997 | Ito et al. ......................... 297/336 X |

FOREIGN PATENT DOCUMENTS

| 0 306 374 | 3/1989 | European Pat. Off. . |
| 2 563 716 | 11/1985 | France . |
| 24 41 398 | 3/1976 | Germany . |
| 3111667 | 10/1982 | Germany ............... 297/378.1 |
| 3314230 | 10/1984 | Germany ............... 297/378.1 |
| 3340697 | 5/1985 | Germany ............... 297/378.12 |
| 44 28 715 | 2/1996 | Germany . |
| 404183411 | 6/1992 | Japan ................. 297/378.12 |

Primary Examiner—Peter M. Cuomo
Assistant Examiner—David E. Allred
Attorney, Agent, or Firm—Pollock, Vande Sande & Amernick

[57] ABSTRACT

An actuating mechanism for unlocking the safety-catch of a foldable back, equipped with angle adjusting mechanism, of a car-seat has a control cable attached to the upper actuating lever and reversed forward via a lower reversing position and acting on the safety-catch which acts with a locking pin. Provided between the lower reversing position and the safety-catch, below the control cable, is an additional reversing mechanism which moves the lower control cable area upward in relation to its stretched state and, in the state of utilization of the seat-back, always maintains equal the angle of wrap of the typically provided lower reversing position in all leaning positions. This results in a considerable gain in adjusting path for the actuating lever.

6 Claims, 2 Drawing Sheets

ACTUATING MECHANISM FOR UNLOCKING THE SAFETY-CATCH OF A FOLDABLE BACK OF A CAR SEAT

FIELD OF THE INVENTION

The present invention relates to an actuating mechanism for unlocking the safety-catch of a foldable back, equipped with the angle adjusting mechanism, of a car-seat.

BACKGROUND OF THE INVENTION

With such actuating mechanisms there is the problem that only a limited swivelling angle is available for the swivelling path of the actuating lever. This swivelling angle cannot be increased resulting consequences for operating quality. In this connection, it proves to be a disadvantage that the available swivelling range, already limited, anyway, which determines the actuating course of the safety-catch, cannot be fully utilized. The ability to utilize the swivelling angle is reduced because the seat back cannot be folded into the forward position from a preset fixed position, but rather the folding procedure must be possible with every one of the leaning settings conceivable for use. In actuality, a swivelling path of 40°, as an example, is reduced by 10°, for example, because the seat-back angle adjustable with an angle adjusting mechanism can easily vary by 60° or more in the state of use.

SUMMARY OF THE INVENTION

The present invention is based on the technical problem of designing an actuating mechanism of the known kind in such a way that the adjusting path of the actuating lever can always be utilized to its full extent for actuating the safety-catch, independently of the basic angle of the seat-back as set.

The result of providing an additional reversing mechanism between the lower reversing position and the safety-catch is that the angle of wrap of the control cable around the lower reversing position is practically the same in each of the positions of use that are determined by the adjusting range of the angle adjusting mechanism, unlike in the known solution without additional reversing where the angle of wrap of the lower reversing position does not change depending on the leaning position set for use. In this way, in the present invention the entire adjusting path created by the actuating lever is available for unlocking the safety-catch.

BRIEF DESCRIPTION OF THE DRAWINGS

The preferred embodiment of the invention is illustrated in the accompanying drawings, wherein.

DESCRIPTION OF THE PREFERRED EMBODIMENT(S)

Figure 1:
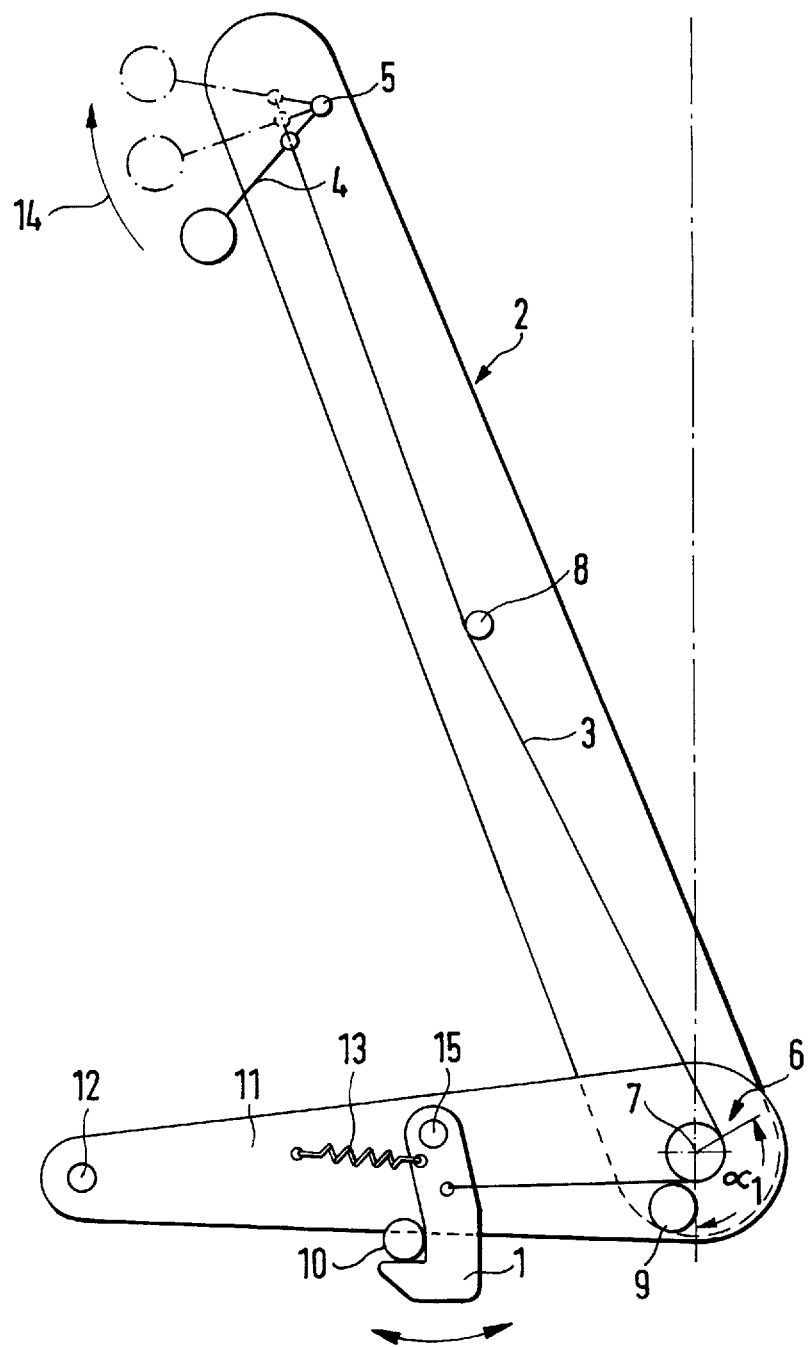
FIG. 1 shows a schematic side view of a seat-back with an adapter in an extremely far forward position.

Seatback 2 supports, at its upper end, an actuating lever 4 designed as a one-armed lever pivotally supported about a bearing support 5 at the upper end of the seat-back. Attached to the actuating lever 4 is a control cable 3 which, approximately in the area of the middle of the seat-back, is guided forwardly in relation to its stretched state by a guide element 8, for example a roller. The control cable 3 runs through a lower circular or cylindrical reversing position member 6 whose center line is designated as number 7. The center line 7 coincides, at least approximately, with the swivelling axis of the angle Adjusting mechanism or the swivelling axis around which the seat-back is pivotally attached to adapter 11. Between the adapter 11 and the seat-back 2, in the area of the swivelling axis 7, and with at least approximately the same axis, is the angle adjusting mechanism (not shown) which, for example, can be a known, wide wobble gear. With this angle adjusting mechanism, the basic angle of the seat-back 2 in relation to the adapter 11 is set.

The adapter 11 is, in turn, hinged around a bolt 12 that connects the adapter in a swivelling manner with the seat. The center of the bolt 12 forms the swivelling axis around which the adapter can be swivelled together with the seat-back 2, when the safety-catch 1 is released. The safety-catch 1 is lodged swivelling around a bolt 15 and, in locked state, grasps from behind a locking pin 10 which is also fixed on the seat (not shown). A restoring spring 13 always pulls the safety-catch 1 into the locking position shown in FIG. 1. For unlocking the safety-catch 1, the actuating lever 4 is pulled out of a basic position (solid) via the middle position (broken-line), into the upper end position (broken-line), in the direction of the arrow 14. In the upper position, marked in broken-line, the safety-catch 1 has released the locking pin 10 and the seat-back 2 can be swung forward around the bolt 12 by means of the adapter 11.

The leaning position shown in FIG. 1 is an extremely far forward leaning position, which can be adjusted for the transport of bulky objects behind the passenger seat. Only in this extremely far forward leaning position shown in FIG. 1, situated outside the actual range of use, is the control cable 3 stretched in the area between the lower reversing position 6 and the safety-catch 1. In this position, the additional lower reversing mechanism 9 only rests precisely against the stretched control cable area.

Figure 2:
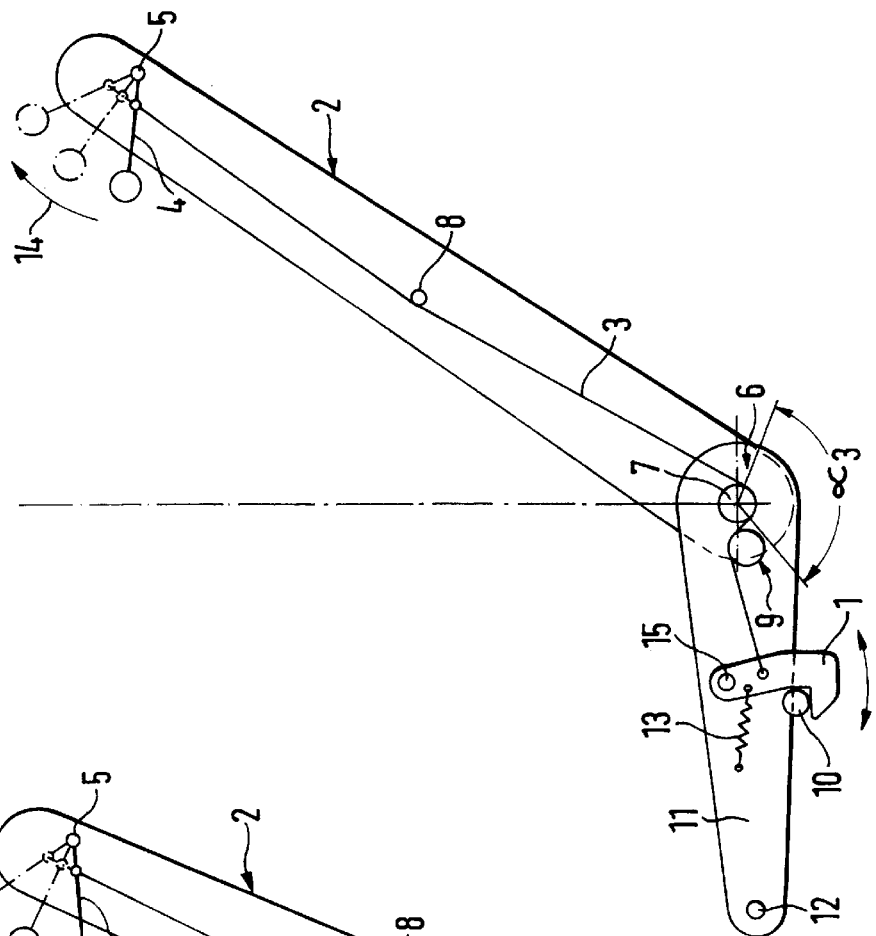
FIG. 2 shows the illustration according to FIG. 1 in utilization position of the seat-back.
Figure 3:
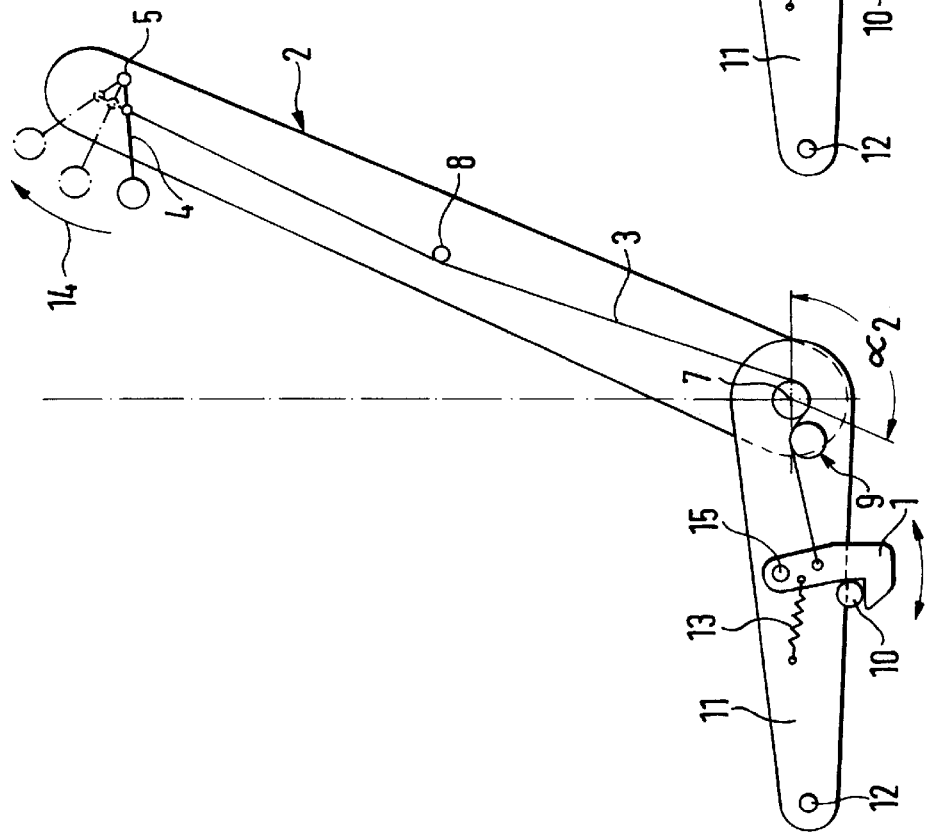
FIG. 3 shows the illustration according to FIGS. 1 and 2 with the seat-back leaned as far back as possible.

In all other actual leaning states of the seat-back, corresponding to practical cases of use, the lower reversing mechanism 9, designed as a reversing roller, always presses the horizontal control cable area upwardly with the result that it enlarges the angle of wrap $a_3$ in FIG. 3 and $a_2$ in FIG. 2 in relation to what it would have been without the additional reversing mechanism 9.

Only in the extreme position shown in FIG. 1, which marks the limit of the range of use, does the lower reversing mechanism 9 no longer affect the then stretched course of the horizontal control cable portion. The angle of wrap al in this extreme position is equal to the angles of wrap $a_2$ and $a_3$. This feature of the invention ensures that cable 3 remains taut in each of the angular positions of the seat-back 2 in relation to the seat bottom. This ensures that rotation of lever 4 between its two extreme positions results in rotation of safety catch 1 so as to permit rotation of seat back 2.

What is claimed is:

1. An apparatus for unlocking a safety-catch of car seat with a foldable seat back, said apparatus comprising:

an actuating lever swingably mounted on a bearing member at a, lateral upper end of said seat back;

an adapter pivotally attached to a lower lateral end of said seat back and adapted to interconnect the seat back with a seat bottom;

a control cable having one end attached to said actuating lever, an intermediate portion resting on a lower reversing element, and its second end attached to a safety catch, said cable following an adjusting path which varies with the angle of said seat back;

said lower reversing element having a shape at least partially circular forming part of the path of said cable from said actuating lever to said safety catch, said lower reversing element having a center line which substantially coincides with a swiveling axis of said seat back; and an additional reversing element fixed to said seat back between said lower reversing element and said safety catch, said additional reversing element moving through an angle about said swivel axis equal through which the seat back moves, said additional reversing element wraps said cable between said lower reversing element and said catch on said lower reversing element as said cable between said actuating lever and said lower reversing element is unwrapped by the seat back being moved and said additional reversing element unwraps said cable when said seat back wraps said cable to maintain the angle of wrap of said control cable around said lower reversing element such that the angle of wrap is substantially constant when of the angle of the seat back varies.

2. The apparatus according to claim 1, wherein the additional reversing element is a reversing roller.

3. The apparatus according to claim 1 wherein the lower reversing element is a transfer tube running between opposite lower lateral sides of the seat-back.

4. The apparatus according to claim 2 wherein the lower reversing element is a transfer tube running between opposite lower lateral sides of the seat-back.

5. The apparatus according to claim 1 wherein said additional reversing element is adapted to press said control cable upward to enlarge said angle of wrap with respect to what it would have been without said additional reversing element.

6. The apparatus according to claim 1 wherein said additional reversing element enlarges said angle of wrap only within a predetermined range of use of said seat back.

* * * * *